(12) United States Patent
Itoi

(10) Patent No.: US 9,505,857 B2
(45) Date of Patent: Nov. 29, 2016

(54) PRE-EXPANDED POLYPROPYLENE RESIN PARTICLES, IN-MOLD FOAM MOLDED PRODUCT OF POLYPROPYLENE RESIN, AND METHOD FOR MANUFACTURING SAME

(75) Inventor: Akihiro Itoi, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 141 days.

(21) Appl. No.: 14/005,108

(22) PCT Filed: Mar. 16, 2012

(86) PCT No.: PCT/JP2012/056854
§ 371 (c)(1),
(2), (4) Date: Sep. 13, 2013

(87) PCT Pub. No.: WO2012/124805
PCT Pub. Date: Sep. 20, 2012

(65) Prior Publication Data
US 2014/0005287 A1    Jan. 2, 2014

(30) Foreign Application Priority Data

Mar. 17, 2011 (JP) .................. 2011-059765

(51) Int. Cl.
*C08J 9/18* (2006.01)
*C08F 110/06* (2006.01)
(Continued)

(52) U.S. Cl.
CPC ............. *C08F 110/06* (2013.01); *B29C 44/08* (2013.01); *B29C 44/3461* (2013.01); *C08J 9/0061* (2013.01); *C08J 9/122* (2013.01); *C08J 9/141* (2013.01); *C08J 9/18* (2013.01); *C08J 9/232* (2013.01); *C08J 2201/034* (2013.01); *C08J 2203/06* (2013.01); *C08J 2203/14* (2013.01); *C08J 2323/14* (2013.01); *C08J 2471/02* (2013.01)

(58) Field of Classification Search
CPC ................................................ C08J 9/16–9/20
See application file for complete search history.

(56) References Cited

U.S. PATENT DOCUMENTS

2004/0054042 A1*  3/2004  Iwamoto et al. ............. 524/100

FOREIGN PATENT DOCUMENTS

| JP | 60-166442 A | 8/1985 |
|---|---|---|
| JP | 62-128709 A | 6/1987 |

(Continued)

OTHER PUBLICATIONS

Machine translation of JP 2008-308668 by Yoneda et al.*

(Continued)

*Primary Examiner* — Mike M Dollinger
*Assistant Examiner* — Christina Wales
(74) *Attorney, Agent, or Firm* — Westerman, Hattori, Daniels & Adrian, LLP

(57) ABSTRACT

Provided are pre-expanded polypropylene resin particles having a dimensional expansion coefficient of 1.5% or more determined with a thermomechanical analyzer at a constant compressive load of 1 mg during heating from 30° C. to 100° C. at a temperature increase rate of 10° C./min. Using the pre-expanded polypropylene resin particles can yield an in-mold foam molded product of polypropylene resin having few wrinkles and small dimensional shrinkage without pretreatment such as internal pressure application or compression packing during packing the pre-expanded particles in a mold for in-mold foam molding.

2 Claims, 1 Drawing Sheet

(51) Int. Cl.
  *B29C 44/34*  (2006.01)
  *B29C 44/08*  (2006.01)
  *C08J 9/00*  (2006.01)
  *C08J 9/12*  (2006.01)
  *C08J 9/14*  (2006.01)
  *C08J 9/232*  (2006.01)

(56) References Cited

FOREIGN PATENT DOCUMENTS

| JP | 63-256634 A | 10/1988 |
| JP | 63-258939 A | 10/1988 |
| JP | 02-130135 A | 5/1990 |
| JP | 2008-308668 A | 12/2008 |
| JP | 2010-013605 A | 1/2010 |
| JP | 2010013605 A * | 1/2010 |
| JP | 2010-106238 A | 5/2010 |

OTHER PUBLICATIONS

Machine translation of JP 2010-106238 by Kiguchi et al.*
Partial human translation of JP 2010-013605 by Ochikoshi et al.*
Translation of Written Opinion dated Jun. 19, 2012 issued in corresponding application No. PCT/JP2012/056854.
International Search report dated Jun. 19, 2012, issued in corresponding application No. PCT/JP2012/056854.

* cited by examiner

PRE-EXPANDED POLYPROPYLENE RESIN PARTICLES, IN-MOLD FOAM MOLDED PRODUCT OF POLYPROPYLENE RESIN, AND METHOD FOR MANUFACTURING SAME

TECHNICAL FIELD

The present invention relates to pre-expanded polypropylene resin particles and an in-mold foam molded product of polypropylene resin.

BACKGROUND ART

An in-mold foam molded product obtained by packing pre-expanded polypropylene resin particles in a mold and hot-forming the particles with steam or other means has features such as an arbitrary shape, lightweight, and heat-insulating properties that are advantages of the in-mold foam molded product.

The in-mold foam molded product obtained by using the pre-expanded polypropylene resin particles is excellent in chemical resistance, heat resistance, and strain recovery after compression as compared with an in-mold foam molded product obtained by using expanded polystyrene resin particles, and is also excellent in dimensional precision, heat resistance, and compressive strength as compared with an in-mold foam molded product obtained by using expanded polyethylene resin particles.

On account of these features, the in-mold foam molded product obtained by using the expanded polypropylene resin particles has been used for various purposes, for example, a heat insulating material, a shock absorbing packing material, an automobile interior member, and a core material for an automobile bumper.

A conventional method for manufacturing the pre-expanded polypropylene resin particles is exemplified by a method of pressing an inorganic gas such as air into pre-expanded polypropylene resin particles in advance (what is called an "internal pressure application method") and performing in-mold foam molding and a method of packing pre-expanded polypropylene resin particles in a mold while compressing the particles and performing in-mold foam molding (what is called a "compression packing method").

However, the internal pressure application method has problems of requiring a large pressure device and requiring time for applying internal pressure. The compression packing method also has problems of requiring an apparatus for pressurizing and packing pre-expanded particles and requiring modification of an existing molding machine.

Because of these problems, a method of using pre-expanded polypropylene resin particles without pretreatment and performing in-mold foam molding may be employed.

However, the method of using pre-expanded polypropylene resin particles without pretreatment and performing in-mold foam molding is difficult to produce a molded product having a beautiful surface. For example, wrinkles remain after drying and shrinkage fails to return after drying because the molded product is likely to be deformed after molding.

In order to solve these problems, various methods have been studied using pre-expanded polypropylene resin particles without pretreatment and performing in-mold foam molding.

Patent Document 1 discloses a method of disposing an in-mold foam molded product of polyolefin resin in a temperature environment 25 to 50° C. lower than a melting point of the substrate resin when the volume of the molded product after released from a mold is 70 to 110% of the volume in the mold and leaving the molded product until the temperature of the molded product reaches at least the environmental temperature.

Patent Document 2 discloses a method of aging an in-mold foam molded product of polyolefin resin after released from a mold by using an aging apparatus with a carriage at an environmental temperature of 90 to 120° C.

Drying the in-mold foam molded product of polypropylene resin typically employs a drying chamber at 60 to 80° C., and thus the methods of Patent Documents 1 and 2 unfortunately require a special drying chamber or apparatus.

Other studies focus the melting energy of pre-expanded polypropylene resin particles at a high temperature peak of a DSC curve, as below.

Patent Document 3 discloses a method of using pre-expanded polypropylene resin particles that have a melting energy of 8 to 12 J/g at a high temperature peak of a DSC curve in a condition of a bulk density of 0.04 g/cc or more and have a melting energy of 8 J/g or more at a high temperature peak in a condition of a bulk density of less than 0.04 g/cc.

Patent Document 4 discloses a method of using pre-expanded polypropylene resin particles that have a melting energy of 8 to 20 J/g at a high temperature peak in a condition of a weight of 3 mg or more and a bulk density of 0.04 g/cc or more and have a melting energy of 8 J/g or more at a high temperature peak in a condition of a bulk density of less than 0.04 g/cc.

Patent Document 5 discloses a method of using pre-expanded polypropylene resin particles that have a melting energy of 8 to 20 J/g at a high temperature peak in a condition of a cell size of 3 mm or less and a bulk density of 0.04 g/cc or more and have a melting energy of 8 J/g or more at a high temperature peak in a condition of a bulk density of less than 0.04 g/cc.

CITATION LIST

Patent Literatures

Patent Document 1: JP-A No. S60-166442
Patent Document 2: JP-A No. H02-130135
Patent Document 3: JP-A No. S62-128709
Patent Document 4: JP-A No. S63-258939
Patent Document 5: JP-A No. S63-256634

SUMMARY OF INVENTION

Technical Problem

In order to improve the flowability and packing properties of pre-expanded particles and to handle a minute shape, the inventors of the present invention have tried to obtain an in-mold foam molded product by a method of using lightweight pre-expanded polypropylene resin particles without pretreatment (for example, without internal pressure application) and performing in-mold foam molding.

However, the inventors of the present invention have found that using the pre-expanded particles satisfying Patent Documents 3 to 5 also causes problems in which a molded product is largely deformed after the in-mold foam molding and has wrinkles and even such a method fails to produce a molded product with a beautiful surface. In addition, drying for a long period of time or drying at a high temperature is required in order to obtain a molded product with a beautiful surface.

A possible reason for this is that pre-expanded particles having a smaller weight have a larger surface area per unit volume, thus air readily diffuses during in-mold foam molding, and this is likely to reduce the air pressure in a molded product after the in-mold foam molding. Accordingly, it is supposed that the technique above fails to sufficiently achieve the in-mold foam molding.

Solution to Problem

As a result of intensive studies in order to solve the problems, the inventors of the present invention have found that lightweight pre-expanded polypropylene resin particles that are readily expanded even at a low temperature are used without pretreatment (for example, without internal pressure application) and are subjected to in-mold foam molding to thereby yield an in-mold foam molded product having small shrinkage and a beautiful surface, and have completed the present invention.

That is, the present invention includes the aspects below.
[1] Pre-expanded polypropylene resin particles include a polypropylene resin as a substrate resin, the resin particles having an average particle weight of 3 mg/particle or less, and the pre-expanded particles having a dimensional expansion coefficient of 1.5% or more determined with a thermomechanical analyzer at a constant compressive load of 0.1 g during heating from 30° C. to 100° C. at a temperature increase rate of 10° C./min.
[2] An in-mold foam molded product of polypropylene resin obtained by in-mold foam molding of the pre-expanded polypropylene resin particles according to the aspect [1] without internal pressure application.
[3] A method for manufacturing pre-expanded polypropylene resin particles includes dispersing polypropylene resin particles including a polypropylene resin composition in a dispersion medium in the presence of a foaming agent, heating the dispersion mixture under pressure, and discharging the dispersion mixture into a low pressure area, thereby affording pre-expanded polypropylene resin particles; and further heating the pre-expanded polypropylene resin particles with steam at 0.04 MPa (G) or more and 0.15 MPa (G) or less for 30 seconds or more.
[4]A method for manufacturing pre-expanded polypropylene resin particles includes dispersing polypropylene resin particles including a polypropylene resin composition in a dispersion medium in the presence of a foaming agent, heating the dispersion mixture under pressure, and discharging the dispersion mixture into a low pressure area, thereby affording pre-expanded polypropylene resin particles; pressurizing the pre-expanded polypropylene resin particles with an inorganic gas to make the pressure in the pre-expanded polypropylene resin particles higher than atmospheric pressure; and then heating the pre-expanded polypropylene resin particles with steam at 0.04 MPa (G) or more and 0.15 MPa (G) or less for 90 seconds or more.

Advantageous Effects of Invention

The present invention uses pre-expanded polypropylene resin particles that are readily expanded even at a low temperature and thus can provide an in-mold foam molded product having a beautiful surface by in-mold foam molding even without pretreatment (for example, without internal pressure application).

DESCRIPTION OF EMBODIMENTS

Figure 1:
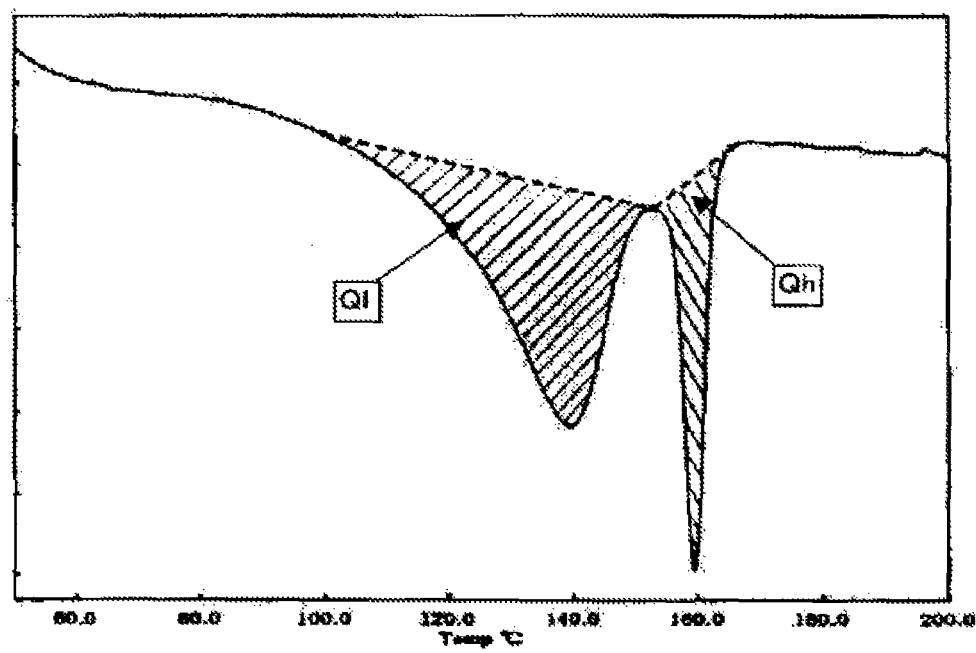
FIG. 1 is an example of a DSC curve obtained with a differential scanning calorimeter (DSC) by heating pre-expanded polypropylene resin particles of the present invention where the particles are heated from 40° C. to 220° C. at a temperature increase rate of 10° C./min. Here, Ql is a lower-temperature-region melting-peak heat quantity that is the heat quantity surrounded by the melting peak curve in a lower temperature region and the tangent line from the local maximum point between the lower temperature peak and the higher temperature peak to the melting start base line, and Qh is a higher-temperature-region melting-peak heat quantity that is the heat quantity surrounded by the melting peak curve in a higher temperature region and the tangent line from the local maximum point between the lower temperature peak and the higher temperature peak to the melting end base line in the DSC curve.

A polypropylene resin used as the substrate resin in the present invention is not particularly limited as long as propylene is contained as a main monomer component and examples include a propylene homopolymer, an olefin-propylene random copolymer, and an olefin-propylene block copolymer. These resins may be used singly or in combination of two or more of them.

Any copolymerizable olefin can be used in the polypropylene resin used in the present invention and olefins having a carbon number of 2 or 4 or more are exemplified. Specific examples of the olefin having a carbon number of 2 or 4 or more include ethylene; α-olefins such as 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene; cyclic olefins such as cyclopentene, norbornene, and tetracyclo[$6,2,1^{1,8}, 1^{3,6}$]-4-dodecene; and dienes such as 5-methylene-2-norbornene, 5-ethylidene-2-norbornene, 1,4-hexadiene, methyl-1,4-hexadiene, and 7-methyl-1,6-octadiene. These olefins having a carbon number of 2 or 4 or more may be used singly or in combination of two or more of them.

Among these olefins having a carbon number of 2 or 4 or more, ethylene and α-olefins are preferred and ethylene and 1-butene are most preferred from the viewpoint of easy availability, cost, and mechanical characteristics.

The polypropylene copolymer used in the present invention preferably contains an olefin in an amount of 10% by weight or less, more preferably 1% by weight or more and 7% by weight or less, even more preferably 1.5% by weight or more and 6% by weight or less, and particularly preferably 1.5% by weight or more and 5% by weight or less.

A polypropylene copolymer containing an olefin in an amount of more than 10% by weight is likely to yield an in-mold foam molded product of polypropylene resin having low dimensional stability at a high temperature.

The polypropylene resin used in the present invention may be copolymerized with an additional vinyl monomer such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinylbenzene as long as the object of the present invention is not impaired.

Among these polypropylene resins, a propylene-ethylene-1-butene random copolymer that is a propylene-ethylene random copolymer containing ethylene and 1-butene and a propylene-1-butene random copolymer are suitably used from the viewpoint of good foamability, improvement in resistance to low temperature brittleness, low cost, and other advantages.

The polypropylene resin used in the present invention preferably has a melting point of 100° C. or more and 160° C. or less, more preferably 110° C. or more and 155° C. or less, and even more preferably 115° C. or more and 150° C. or less.

A polypropylene resin having a melting point of less than 100° C. is likely to yield an in-mold foam molded product of polypropylene resin having lower dimensional stability at a high temperature, and a polypropylene resin having a melting point of more than 160° C. is likely to increase steam pressure for mold heating during in-mold foam molding.

Here, the melting point of a polypropylene resin in the present invention is determined as follows: with a differential scanning calorimeter (hereinafter called "DSC"), 1 mg or more and 10 mg or less of polypropylene resin is heated from 40° C. to 220° C. at a temperature increase rate of 10° C./min, then is cooled from 220° C. to 40° C. at a temperature drop rate of 10° C./min, and is re-heated from 40° C. to 220° C. at a temperature increase rate of 10° C./min; and the peak temperature of an endothermic peak on a DSC curve in the second temperature increase is regarded as the melting point.

The polypropylene resin used in the present invention may have any melt flow rate (hereinafter called "MFR") and the MFR is preferably 0.5 g/10 min or more and 50 g/10 min or less, more preferably 2 g/10 min or more and 30 g/10 min or less, even more preferably 3 g/10 min or more and 20 g/10 min or less, and particularly preferably 6 g/10 min or more and 15 g/10 min or less.

A polypropylene resin having a MFR within the range readily yields pre-expanded polypropylene resin particles having a relatively large expansion ratio, and subjecting the pre-expanded particles to in-mold foam molding can produce an in-mold foam molded product of polypropylene resin excellent in beautiful surface properties and having a small dimensional shrinkage ratio.

Here, the MFR in the present invention is determined by using a MFR measurement apparatus in accordance with JIS K7210 in a condition of an orifice diameter of 2.0959±0.005 mm, an orifice length of 8.000±0.025 mm, a load of 2,160 g, and at 230±0.2° C.

The polypropylene resin used in the present invention preferably contains no cross-linkage but may be cross-linked by a peroxide or radiation.

The polypropylene resin used in the present invention may contain an additional thermoplastic resin usable as a mixture with the polypropylene resin, such as low-density polyethylene, linear low density polyethylene, polystyrene, polybutene, and ionomer, as long as the characteristics of the polypropylene resin are not impaired.

The polypropylene resin used in the present invention can be obtained by using a catalyst such as a Ziegler catalyst, a metallocene catalyst, and a post-metallocene catalyst. Using a Ziegler catalyst can produce a polypropylene polymer having a large Mw/Mn.

Oxidative decomposition of the polypropylene resin used in the present invention with an organic peroxide allows characteristics such as molecular weight and MFR of the resin to be controlled.

Examples of the organic peroxide used in the present invention include 1,1-bis(t-butylperoxy)-3,3,5-trimethylcyclohexane, t-butyl peroxylaurate, 2,5-dimethyl-2,5-di(benzoylperoxy)hexane, t-butyl peroxybenzoate, dicumyl peroxide, 1,3-bis(t-butylperoxyisopropyl)benzene, and t-butylperoxyisopropyl monocarbonate.

In the present invention using an organic peroxide, the organic peroxide is preferably used in an amount of 0.001 part by weight or more and 0.1 part by weight or less with respect to 100 parts by weight of the polypropylene resin.

Examples of the method for oxidative decomposition of the polypropylene resin include a method of heating and melting the polypropylene resin together with an organic peroxide in an extruder.

In the present invention, as necessary, the polypropylene resin may further contain cell nucleating agents such as talc; stabilizers such as an antioxidant, a metal deactivator, a phosphorus processing stabilizer, an ultraviolet absorber, an ultraviolet stabilizer, a fluorescent brightening agent, and a metallic soap; and other additives such as a cross-linking agent, a chain transfer agent, a lubricant, a plasticizer, a filler, a reinforcement, an inorganic pigment, an organic pigment, a conductivity enhancer, a flame retardant, a surfactant, and a polymer antistatic agent to prepare a polypropylene resin composition as long as the advantageous effects of the present invention is not impaired.

In such a case, an additive is typically, preferably added into a melted resin during the production process of the resin particles.

The polypropylene resin composition of the present invention is typically melted and mixed using an extruder, a kneader, a Banbury mixer, a roll, or other means in advance to be formed into polypropylene resin particles having an intended particle shape such as a column shape, an ellipsoidal shape, a spherical shape, a cubic shape, and a rectangular shape in order to be easily used for pre-foaming.

The polypropylene resin particles used in the present invention preferably have an average particle weight of 3.0 mg/particle or less and more preferably 0.5 mg/particle or more and 2.0 mg/particle or less in order to yield the pre-expanded particles having higher flowability and packing property and to handle a minute shape.

The method for manufacturing the pre-expanded polypropylene resin particles of the present invention is not particularly limited, and a preferred method is, for example, what is called a "depressurized expanding method" in which polypropylene resin particles are dispersed in a dispersion medium in the presence of a foaming agent together with a dispersant in a closed container, the dispersion mixture is heated under pressure to a predetermined foaming temperature and the resin particles are impregnated with the foaming agent, and then the dispersion mixture in the closed container is discharged into a low pressure area to expand the resin particles while the temperature and pressure are maintained constant in the container because, for example, pre-expanded particles having a high closed cell ratio and an intended expansion ratio are easily obtained.

The heating temperature in the closed container preferably ranges from a temperature 25° C. lower than the melting point of the polypropylene resin particles to a temperature 25° C. higher than the melting point of the polypropylene resin particles and more preferably from a temperature 15° C. lower than the melting point of the polypropylene resin particles to a temperature 15° C. higher than the melting point of the polypropylene resin particles.

The polypropylene resin particles are heated at the temperature under pressure to be impregnated with the foaming agent and then opening an end of the closed container causes the polypropylene resin particles to be discharged into a lower pressure atmosphere than that in the closed container, thereby producing pre-expanded polypropylene resin particles having a high closed cell ratio and an intended expansion ratio.

The closed container for dispersing the polypropylene resin particles is not particularly limited as long as the container can resist the pressure in the container and the temperature in the container during the production of the pre-expanded polypropylene resin particles. An autoclave container can be exemplified.

Usable examples of the dispersion medium include methanol, ethanol, ethylene glycol, glycerin, and water, and among them, water is preferably used.

The dispersion medium preferably contains a dispersant in order to prevent the polypropylene resin particles from bonding to each other. Examples of the dispersant include inorganic dispersants such as tribasic calcium phosphate, magnesium phosphate, basic magnesium carbonate, calcium carbonate, barium sulfate, kaolin, talc, and clay.

In the present invention, a dispersion aid is preferably used in combination, as necessary, and examples include sodium dodecylbenzenesulfonate, sodium n-paraffinsulfonate, sodium α-olefinsulfonate, magnesium sulfate, magnesium nitrate, magnesium chloride, aluminum sulfate, aluminum nitrate, aluminum chloride, iron sulfate, iron nitrate, and iron chloride.

Among them, tribasic calcium phosphate and sodium n-paraffinsulfonate are more preferably used in combination.

The amounts of the dispersant and the dispersion aid in the present invention vary depending on the types of a dispersant and a dispersion aid or the type or the amount of a polypropylene resin to be used. The dispersant is typically, preferably contained in an amount of 0.2 part by weight or more and 3 parts by weight or less with respect to 100 parts by weight of the dispersion medium, and the dispersion aid is preferably contained in an amount of 0.001 part by weight or more and 0.1 part by weight or less with respect to 100 parts by weight of the dispersion medium, in order to maintain dispersion stability, not to bond the dispersant to the surface of pre-expanded particles to be obtained, and not to suppress the fusion between pre-expanded particles during in-mold foam molding.

The polypropylene resin particles are typically, preferably used in an amount of 20 parts by weight or more and 100 parts by weight or less with respect to 100 parts by weight of the dispersion medium in order to improve the dispersivity in the dispersion medium.

The foaming agent used in the production of the pre-expanded polypropylene resin particles of the present invention is not particularly limited and examples include aliphatic hydrocarbons such as propane, isobutane, n-butane, isopentane, and n-pentane; inorganic gases such as air, nitrogen, and carbon dioxide; and water. These foaming agents may be used singly or in combination of two or more of them.

The amount of the foaming agent used in the present invention varies depending on the type of a resin used, the type of a foaming agent used, and an intended expansion ratio, and the foaming agent can be appropriately used depending on an intended expansion ratio of pre-expanded polypropylene resin particles. The foaming agent is typically, preferably used in an amount of 1 part by weight or more and 60 parts by weight or less with respect to 100 parts by weight of the polypropylene resin particles.

In the present invention, polypropylene resin particles using water as the foaming agent preferably contain at least one compound selected from the group consisting of a hydrophilic polymer, a polyhydric alcohol, and a compound having a triazine skeleton in order to yield pre-expanded polypropylene resin particles having a high expansion ratio.

Examples of the hydrophilic polymer used in the present invention include carboxyl group-containing polymers such as an ethylene-acrylic acid-maleic anhydride terpolymer, an ethylene-(meth)acrylic acid copolymer, and an ionomer resin obtained by cross-linking of an ethylene-(meth)acrylic acid copolymer with a metal ion, and polyethylene glycol. These polymers may be used singly or in combination of two or more of them.

The amount of the hydrophilic polymer used in the present invention varies depending on the type of a hydrophilic polymer and is not particularly limited. The amount is typically, preferably 0.01 part by weight or more and 20 parts by weight or less and more preferably 0.1 part by weight or more and 5 parts by weight or less with respect to 100 parts by weight of the polypropylene resin particles.

A hydrophilic polymer used in an amount of less than 0.01 part by weight is unlikely to yield pre-expanded polypropylene resin particles having a high expansion ratio, and a hydrophilic polymer used in an amount of more than 20 parts by weight may largely reduce the heat resistance and mechanical strength.

Examples of the polyhydric alcohol used in the present invention include ethylene glycol, glycerin, erythritol, and pentaerythritol. These alcohols may be used singly or in combination of two or more of them.

The amount of the polyhydric alcohol used in the present invention varies depending on the type of a polyhydric alcohol and is not particularly limited. The amount is typically, preferably 0.01 part by weight or more and 10 parts by weight or less and more preferably 0.1 part by weight or more and 2 parts by weight or less with respect to 100 parts by weight of the polypropylene resin particles.

A polyhydric alcohol used in an amount of less than 0.01 part by weight is unlikely to yield pre-expanded polypropylene resin particles having a high expansion ratio, and a polyhydric alcohol used in an amount of more than 10 parts by weight may largely reduce the heat resistance and mechanical strength.

The compound having a triazine skeleton used in the present invention preferably has a molecular weight per unit triazine skeleton of 300 or less. A compound having a molecular weight per unit triazine skeleton of more than 300 may cause marked variation in the expansion ratio and marked variation in the cell size. Here, the molecular weight per triazine skeleton is a value obtained by dividing a molecular weight by the number of triazine skeletons contained in a molecule.

Examples of the compound having a molecular weight per unit triazine skeleton of 300 or less include melamine [chemical name: 1,3,5-triazine-2,4,6-triamine], ammeline [chemical name: 1,3,5-triazine-2-hydroxy-4,6-diamine], ammelide [chemical name: 1,3,5-triazine-2,4-hydroxy-6-amine], cyanuric acid [chemical name: 1,3,5-triazine-2,4,6-triol], tris(methyl) cyanurate, tris(ethyl) cyanurate, tris(butyl) cyanurate, tris(2-hydroxyethyl) cyanurate, and a condensation product of melamine and isocyanuric acid. These compounds may be used singly or in combination of two or more of them.

Among them, melamine, isocyanuric acid, and a condensation product of melamine and isocyanuric acid are preferably used in order to yield pre-expanded polypropylene resin particles having a high expansion ratio and having small variation in the expansion ratio and small variation in the cell size.

The amount of the compound having a triazine skeleton used in the present invention varies depending on the type of a compound having a triazine skeleton and is not particularly limited. The amount is typically, preferably 0.01 part by weight or more and 15 parts by weight or less and more preferably 0.1 part by weight or more and 3 parts by weight or less with respect to 100 parts by weight of the polypropylene resin particles.

A compound having a triazine skeleton used in an amount of less than 0.01 part by weight is unlikely to yield pre-expanded polypropylene resin particles having a high expansion ratio, and a compound having a triazine skeleton used in an amount of more than 15 parts by weight may largely reduce the heat resistance and mechanical strength.

In the present invention, to a polypropylene resin using carbon dioxide as the foaming agent, adding melamine, borax, zinc borate, glycerin, or a hydrophilic substance having a low molecular weight, such as polyethylene glycol having a molecular weight of 300 or less can yield pre-expanded polypropylene resin particles having a high expansion ratio and a uniform cell size.

The pre-expanded polypropylene resin particles obtained by the production method above preferably have an expansion ratio of 3 times or more and 50 times or less and more preferably 7 times or more and 45 times or less.

Alternatively, pre-expanded polypropylene resin particles having a high expansion ratio may be obtained by what is called a "two-stage expanding method" in which pre-expanded polypropylene resin particles having an expansion ratio of 3 times or more and 35 times or less are once produced, the pre-expanded polypropylene resin particles in a closed container are impregnated with, for example, nitrogen or air by pressurizing treatment to make the pressure in the pre-expanded polypropylene resin particles higher than ambient pressure, and then the pre-expanded polypropylene resin particles are heated with steam or other means to further expand the pre-expanded polypropylene resin particles.

Here, the expansion ratio is calculated in accordance with the equation below by determining the weight w (g) of pre-expanded polypropylene resin particles, the volume v (cm$^3$) of pre-expanded polypropylene resin particles immersed in ethanol, and the density d (g/cm$^3$) of polypropylene resin particles before expansion.

Expansion ratio=$d \times v/w$

Controlling the dimensional expansion coefficient during heating from 30° C. to 100° C. at a temperature increase rate of 10° C./min allows the pre-expanded polypropylene resin particles of the present invention to yield an in-mold foam molded product having small shrinkage and a beautiful surface by in-mold foam molding even without pretreatment.

The pre-expanded polypropylene resin particles of the present invention preferably have a dimensional expansion coefficient of 1.5% or more, more preferably 1.5% or more and 10% or less, and even more preferably 1.5% or more and 5% or less, during heating from 30° C. to 100° C. at a temperature increase rate of 10° C./min.

Pre-expanded polypropylene resin particles having a dimensional expansion coefficient of less than 1.5% in the heating condition are likely to yield an in-mold foam molded product having larger shrinkage. However, pre-expanded polypropylene resin particles having a dimensional expansion coefficient of more than 5% in the heating condition obtain a small effect of the increase in the expansion coefficient and require higher heating temperature or longer time during the production, thereby being likely to deteriorate the production efficiency and to increase the cost.

Here, the dimensional expansion coefficient of pre-expanded polypropylene resin particles is determined by the measurement as below. In other words, a constant compressive load of 0.1 g is applied to a pre-expanded polypropylene resin particle with a thermomechanical analyzer (TMA), and the initial size $L_0$ (mm) and the maximum size $L_{max}$ (mm) are determined when the temperature is increased from 30° C. to 100° C. at a temperature increase rate of 10° C./min. Then, the dimensional expansion coefficient is calculated in accordance with the equation below.

Dimensional expansion coefficient=$(L_{max}-L_0)/L_0 \times 100(\%)$

The pre-expanded polypropylene resin particles of the present invention having a large dimensional expansion coefficient from 30° C. to 100° C. can be easily expanded even in a low temperature condition in an initial heated state during in-mold foam molding and this suppresses the pressure increase by air expansion in the pre-expanded particles due to the subsequent heating, prevents air from dissipating, and increases the air pressure in a molded product after in-mold foam molding. This is considered to be the reason for the suppression of the deformation of the in-mold foam molded product.

The method for manufacturing the pre-expanded polypropylene resin particles having a large dimensional expansion coefficient from 30° C. to 100° C. is not particularly limited and examples include a method of relieving the stretching to a cell membrane of the pre-expanded particles.

Examples of the method for relieving the stretching to the cell membrane of the pre-expanded particles include a method of heating, with steam or other means, the pre-expanded particles obtained by depressurized expanding, a method of increasing the heating time in the two-stage expanding, and a method of increasing the heating temperature in the two-stage expanding.

In the method of increasing the expansion coefficient by heating, with steam or other means, the pre-expanded particles obtained by depressurized expanding, the heating time is preferably 30 seconds or more and more preferably 30 seconds or more and 90 seconds or less.

A heating time of less than 30 seconds is insufficient to relieve the stretching and thus may not increase the expansion coefficient.

The steam pressure for heating is preferably 0.04 MPa (G) or more and 0.15 MPa (G) or less and more preferably 0.06 MPa (G) or more and 0.13 MPa (G) or less. A heating steam pressure of less than 0.04 MPa (G) is insufficient to relieve the stretching and thus may not increase the expansion coefficient, and a heating steam pressure of more than 0.15 MPa (G) may cause adhesion among the pre-expanded particles.

In the method of increasing the expansion coefficient by the two-stage expanding, the time for heating the pre-expanded polypropylene resin particles to be impregnated with, for example, nitrogen or air is preferably 90 seconds or more and more preferably 90 seconds or more and 150 seconds or less. During the two-stage expanding, a heating time of less than 90 seconds is insufficient to relieve the stretching and thus may not increase the expansion coefficient.

The steam pressure for heating during the two-stage expanding is preferably 0.04 MPa (G) or more and 0.15 MPa (G) or less and more preferably 0.06 MPa (G) or more and 0.13 MPa (G) or less.

During the two-stage expanding, a heating steam pressure of less than 0.04 MPa (G) is insufficient to relieve the stretching and thus may not increase the expansion coefficient, and a heating steam pressure of more than 0.15 MPa (G) may cause adhesion among the pre-expanded particles.

The pre-expanded polypropylene resin particles of the present invention preferably have an average cell size of 30 μm or more and 800 μm or less and more preferably 100 μm or more and 600 μm or less.

Here, the average cell size is determined by arbitrarily selecting 30 pre-expanded particles from pre-expanded polypropylene resin particles, measuring each cell size in accordance with JIS K6402, and calculating the average.

The pre-expanded polypropylene resin particles of the present invention preferably have a closed cell ratio of 88% or more and more preferably 93% or more.

Here, the closed cell ratio is determined by measuring the closed cell volume of pre-expanded polypropylene resin particles with an air pycnometer and dividing the closed cell volume by the apparent volume separately determined by the ethanol immersion method.

The pre-expanded polypropylene resin particles of the present invention preferably have two melting peaks on a DSC curve that is obtained by differential scanning calorimeter measurement in which 5 to 6 mg of pre-expanded polypropylene resin particles are heated from 40° C. to 220° C. at a temperature increase rate of 10° C./min.

The pre-expanded polypropylene resin particles of the present invention preferably have a DSC ratio of 8% or more and 40% or less and more preferably 10% or more and 30% or less. Pre-expanded polypropylene resin particles having a DSC ratio within the range readily yield an in-mold foam molded product of polypropylene resin having high beautiful surface properties.

Here, the DSC ratio is a ratio $[Qh/(Ql+Qh) \times 100]$ of a melting peak in a higher temperature region where Ql is a lower-temperature-region melting-peak heat quantity that is the heat quantity surrounded by the melting peak curve in a lower temperature region and the tangent line from the local maximum point between the lower temperature peak and the higher temperature peak to the melting start base line, and Qh is a higher-temperature-region melting-peak heat quantity that is the heat quantity surrounded by the melting peak curve in a higher temperature region and the tangent line from the local maximum point between the lower temperature peak and the higher temperature peak to the melting end base line in the DSC curve, as shown in FIG. 1.

The DSC ratio varies depending on the temperature and the pressure during foaming in the production of pre-expanded polypropylene resin particles. Thus, arbitrarily controlling the foaming temperature and the foaming pressure can yield pre-expanded particles having an intended DSC ratio. Typically, increasing the foaming temperature and the foaming pressure is likely to reduce the DSC ratio. Though such a tendency varies depending on the type of a polypropylene resin and the types of an additive and a foaming agent, specifically, increasing the foaming temperature by 1° C. reduces the DSC ratio by about 5 to 20%, and increasing the foaming pressure by 0.1 MPa reduces the DSC ratio by about 1 to 10%.

The pre-expanded polypropylene resin particles of the present invention can yield an in-mold foam molded product of polypropylene resin by in-mold foam molding without pretreatment such as internal pressure application and compression packing.

Specific examples of the method for in-mold foam molding from the pre-expanded polypropylene resin particles of the present invention into an in-mold foam molded product of polypropylene resin include a method of packing pre-expanded polypropylene resin particles in a molding space that is formed by two molds and can be closed but cannot be sealed without pretreatment such as internal pressure application and compression packing, molding the pre-expanded polypropylene resin particles using a heating medium such as steam at a heating steam pressure of about 0.15 to 0.4 MPa (G) for a heating time of about 3 to 50 seconds to bond the melted pre-expanded polypropylene resin particles to each other, then cooling the molds with water, opening the molds to yield an in-mold foam molded product of polypropylene resin.

To heat with steam, the pressure is preferably increased over about 5 to 30 seconds until reaching an intended steam pressure.

The in-mold foam molded product of polypropylene resin obtained by using the pre-expanded polypropylene resin particles of the present invention preferably has a density of 10 kg/m³ or more and 300 kg/m³ or less, more preferably 15 kg/m³ or more and 250 kg/m³ or less, and even more preferably 25 kg/m³ or more and 150 kg/m³ or less.

EXAMPLES

Examples and Comparative Examples will be described hereinafter but the present invention is not limited to them.

Substances used in Examples and Comparative Examples are as below without particular purification and other treatment.

Polypropylene resin: ethylene-propylene random copolymer [ethylene content: 2.8%, MFR: 7.0 g/10 min, melting point: 145° C.]

Melamine [manufactured by Mitsui Chemicals, Inc.]

Powdery basic tribasic calcium phosphate [manufactured by Taihei Chemical Industrial Co., Ltd.]

Sodium n-paraffinsulfonate [manufactured by Kao Corporation, LATEMUL PS]

Evaluations in Examples and Comparative Examples were carried out as below.

(DSC Ratio)

With a heat flux differential scanning calorimeter [manufactured by Seiko Instruments, type DSC6200], 5 to 6 mg of pre-expanded polypropylene resin particles obtained were heated from 40° C. to 220° C. at a temperature increase rate of 10° C./min to yield a DSC curve.

From the obtained DSC curve, the DSC ratio was calculated in accordance with the equation below where Ql was a lower-temperature-region melting-peak heat quantity that was the heat quantity surrounded by the melting peak curve in a lower temperature region and the tangent line from the local maximum point between the lower temperature peak and the higher temperature peak to the melting start base line, and Qh was a higher-temperature-region melting-peak heat quantity that was the heat quantity surrounded by the melting peak curve in a higher temperature region and the tangent line from the local maximum point between the lower temperature peak and the higher temperature peak to the melting end base line in the DSC curve, as shown in FIG. 1.

DSC ratio=$Qh/(Ql+Qh)\times 100(\%)$ (Expansion Ratio)

The expansion ratio was calculated in accordance with the equation below by determining the weight w (g) of pre-expanded polypropylene resin particles obtained, the volume v (cm³) of pre-expanded polypropylene resin particles immersed in ethanol, and the density d (g/cm³) of polypropylene resin particles before expansion.

Expansion ratio=$d\times v/w$ (Average Cell Size)

The average cell size was determined by arbitrarily selecting 30 pre-expanded particles from pre-expanded polypropylene resin particles obtained, measuring each cell size in accordance with JIS K6402, and calculating the average.

(Closed Cell Ratio)

The closed cell ratio was determined by measuring the closed cell volume of pre-expanded polypropylene resin particles obtained with an air pycnometer and dividing the closed cell volume by the apparent volume separately determined by the ethanol immersion method.

(Dimensional Expansion Coefficient of Expanded Particles)

Figure 2:
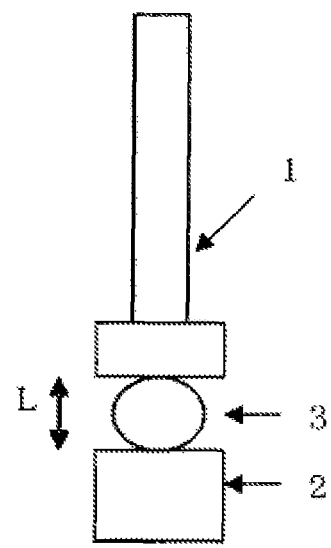
FIG. 2 is a schematic view showing a thermomechanical analyzer with a pre-expanded particle for the measurement of dimensional expansion coefficient. The initial length L is $L_0$ and the maximum length L during temperature rise is $L_{max}$.

A constant compressive load of 0.1 g was applied to a pre-expanded polypropylene resin particle obtained with a thermomechanical analyzer [TMA, manufactured by Bruker AXS, TMA 4000SA] as shown in FIG. 2, and the initial size $L_0$ (mm) and the maximum size $L_{max}$ (mm) were determined when the temperature was increased from 30° C. to 100° C. at a temperature increase rate of 10° C./min. The dimensional expansion coefficient of expanded particles was calculated in accordance with the equation below.

Dimensional expansion coefficient=$(L_{max}-L_0)\times 100/L_0(\%)$ (Surface Appearance)

The surface of an in-mold foam molded product obtained was visually observed and evaluated in accordance with the criteria below.

◯: A surface had little unevenness and little space between particles.

x: A surface had unevenness and large space between particles.

(Surface Wrinkle)

The surface of an in-mold foam molded product obtained was visually observed and evaluated in accordance with the criteria below.

◯: A surface had a few wrinkles.

x: A surface had wrinkles.

(Dimensional Shrinkage Ratio)

The length in a longitudinal direction of an in-mold foam molded product obtained was measured with digital vernier calipers [manufactured by Mitutoyo Corporation] and the dimensional shrinkage ratio (rounding off the third decimal place) with respect to the mold size (a length of 400 mm, a width of 300 mm, and a height of 50 mm) was calculated.

◯: The dimensional shrinkage ratio was 3.00% or less.

x: The dimensional shrinkage ratio was more than 3.00%.

Examples 1 to 6, Comparative Examples 1 to 3

Production of Resin Particles

With respect to 100 parts by weight of polypropylene resin, 0.03 part by weight of talc as a cell nucleating agent was added and mixed, and the mixture was melted and kneaded with a 50 mmφ single screw extruder at a resin temperature of 240° C., and then subjected to granulation, thereby yielding polypropylene resin particles having a particle weight of about 1.8 mg/particle.

[Production of Pre-Expanded Particles]

Into a 10-L closed container, 100 parts by weight of resin particles obtained and 14 parts by weight of isobutane were charged together with 300 parts by weight of water, 1.6 parts by weight of powdery basic tribasic calcium phosphate, and 0.03 part by weight of sodium n-paraffinsulfonate, and the content in the container was heated at a foaming temperature described in Table 1.

Next, isobutane was pressed into the container and the pressure in the container was adjusted to a predetermined foaming pressure described in Table 1. Then, while the pressure in the container was maintained with nitrogen, a lower valve of the closed container was opened to discharge the water dispersion mixture through an orifice plate having a hole size of 4.0 mm to atmospheric pressure, thereby yielding pre-expanded polypropylene resin particles having an expansion ratio of about 20 times.

The obtained pre-expanded polypropylene resin particles were heated with steam for a period of time at a steam pressure described in Table 1, thereby yielding pre-expanded polypropylene resin particles to be used for in-mold foam molding.

The obtained pre-expanded particles were subjected to various evaluations. Table 1 shows the results.

[Production of In-Mold Foam Molded Product]

The obtained pre-expanded polypropylene resin particles were packed into a mold having a length of 400 mm, a width of 300 mm, and a height of 50 mm without pretreatment of internal pressure application or compression packing. Then, the pressure was increased to a steam pressure of 0.30 MPa (G) over 18 seconds, and then the pre-expanded particles were heated for 10 seconds to bond the particles to each other while the pressure was maintained, thereby yielding an in-mold foam molded product of polypropylene resin.

The obtained in-mold foam molded product was dried in a drying chamber at 75° C. for 18 hours. Next, the in-mold foam molded product was taken out of the drying chamber, then was left at 23° C. for 4 hours, and was subjected to the evaluations above. Table 1 shows the results.

Reference Example 1

In [Production of In-mold foam molded product], the pre-expanded polypropylene resin particles obtained in Comparative Example 1 were subjected to air impregnation treatment by air compression to make a pressure in the expanded particles 0.1 MPa (G) and then were packed into a mold having a length of 400 mm, a width of 300 mm, and a height of 50 mm. Then, the pressure was increased to a steam pressure of 0.30 MPa (G) over 18 seconds, and then the pre-expanded particles were heated for 10 seconds to bond the particles to each other while the pressure was maintained, thereby yielding an in-mold foam molded product of polypropylene resin.

The obtained in-mold foam molded product was dried in a drying chamber at 75° C. for 18 hours. Next, the in-mold foam molded product was taken out of the drying chamber, then was left at 23° C. for 4 hours, and was subjected to the evaluations above. Table 1 shows the results.

TABLE 1

|  |  |  | Example 1 | Example 2 | Example 3 | Example 4 | Example 5 | Example 6 | Comparative Example 1 | Comparative Example 2 | Comparative Example 3 | Reference Example 1 |
|---|---|---|---|---|---|---|---|---|---|---|---|---|
| Depressurized expanding condition | Foaming temperature | °C. | 142.5 | 141.9 | 141.9 | 141.9 | 141.9 | 141.9 | 141.9 | 141.9 | 141.9 | 141.9 |
|  | Foaming pressure | MPa(G) | 1.85 | 1.90 | 1.90 | 1.90 | 1.90 | 1.90 | 1.90 | 1.90 | 1.90 | 1.90 |
| Steam heating condition after depressurized expanding | Heating time | sec | 60 | 60 | 40 | 80 | 90 | 160 | Without steam heating | 20 | 40 | Without steam heating |
|  | Steam pressure | MPa(G) | 0.08 | 0.09 | 0.10 | 0.06 | 0.11 | 0.07 |  | 0.08 | 0.03 |  |
| Pre-expanded particles | DSC ration | % | 17.5 | 24.6 | 24.1 | 24.5 | 23.8 | 24.0 | 22.8 | 23.5 | 24.4 | 22.8 |
|  | Expansion ratio | times | 20.5 | 19.8 | 20.2 | 20.4 | 19.4 | 20.0 | 20.8 | 20.9 | 20.7 | 20.8 |
|  | Average cell size | μm | 282 | 261 | 275 | 263 | 266 | 254 | 270 | 272 | 259 | 270 |
|  | Dimensional expansion coefficient | % | 3.4 | 3.0 | 2.0 | 2.9 | 4.8 | 6.4 | 1.0 | 1.2 | 1.3 | 1.0 |
| In-mold foam molded product | Pressure in particles | MPa(G) | 0.00 | 0.00 | 0.00 | 0.00 | 0.00 | 0.00 | 0.00 | 0.00 | 0.00 | 0.10 |
|  | Surface appearance |  | ○ | ○ | ○ | ○ | ○ | ○ | ○ | ○ | ○ | ○ |
|  | Surface wrinkles |  | ○ | ○ | ○ | ○ | ○ | ○ | ○ | ○ | ○ | ○ |
|  | Dimensional shrinkage ratio |  | ○ | ○ | ○ | ○ | ○ | ○ | x | x | x | ○ |

Examples 7 to 9, Comparative Examples 4 to 6

Production of Resin Particles

With respect to 100 parts by weight of polypropylene resin, 0.1 part by weight of talc as a cell nucleating agent and 0.5 part by weight of polyethylene glycol were added and mixed, and the mixture was melted and kneaded with a 50 mmφ single screw extruder at a resin temperature of 240° C., and then subjected to granulation, thereby yielding polypropylene resin particles having a particle weight of about 1.8 mg/particle.

[Production of Pre-Expanded Particles]

Into a 10-L closed container, 100 parts by weight of resin particles obtained and 10 parts by weight of carbon dioxide gas were charged together with 300 parts by weight of water, 1.0 part by weight of powdery basic tribasic calcium phosphate, and 0.05 part by weight of sodium n-paraffinsulfonate, and the content in the container was heated at a foaming temperature described in Table 2.

Next, carbon dioxide gas was pressed into the container and the pressure in the container was adjusted to a predetermined foaming pressure described in Table 2. Then, while the pressure in the container was maintained with nitrogen, a lower valve of the closed container was opened to discharge the water dispersion mixture through an orifice plate having a hole size of 4.0 mm to atmospheric pressure, thereby yielding pre-expanded polypropylene resin particles having an expansion ratio of about 12 times.

The obtained pre-expanded polypropylene resin particles were subjected to two-stage expanding by air impregnation at a pressure in particles for a period of heating time at a heating steam pressure described in Table 2, thereby yielding pre-expanded polypropylene resin particles to be used for in-mold foam molding.

The obtained pre-expanded particles were subjected to the evaluations above. Table 2 shows the results.

[Production of in-Mold Foam Molded Product]

Next, the obtained pre-expanded polypropylene resin particles were packed in a mold having a length of 400 mm, a width of 300 mm, and a height of 50 mm without pretreatment of internal pressure application or compression packing, and the pressure was increased to a steam pressure of 0.30 MPa (G) over 18 seconds, and then the pre-expanded particles were heated for 10 seconds to bond the particles to each other while the pressure was maintained, thereby yielding an in-mold foam molded product of polypropylene resin.

The obtained in-mold foam molded product was dried in a drying chamber at 75° C. for 18 hours. Next, the in-mold foam molded product was taken out of the drying chamber, then was left at 23° C. for 4 hours, and was subjected to the evaluations above. Table 2 shows the results.

TABLE 2

|  |  |  | Example 7 | Example 8 | Example 9 | Comparative Example 4 | Comparative Example 5 | Comparative Example 6 |
|---|---|---|---|---|---|---|---|---|
| Depressurized expanding condition | Foaming temperature | °C. | 148.4 | 148.1 | 148.1 | 148.1 | 148.1 | 148.1 |
|  | Foaming pressure | MPa(G) | 2.6 | 2.70 | 2.70 | 2.70 | 2.70 | 2.70 |
| Two-stage expanding condition | Pressure in particles | MPa | 0.30 | 0.35 | 0.36 | 0.34 | 0.38 | 0.40 |
|  | Heating time | sec | 100 | 100 | 130 | 60 | 30 | 100 |
|  | Steam pressure | MPa(G) | 0.10 | 0.09 | 0.07 | 0.08 | 0.08 | 0.03 |
| Pre-expanded particles | DSC ratio | % | 18.2 | 22.3 | 23.1 | 21.5 | 22.0 | 22.3 |
|  | Expansion ratio | times | 19.8 | 20.1 | 20.2 | 19.7 | 20.6 | 20.8 |
|  | Average cell size | μm | 250 | 215 | 223 | 220 | 31 | 222 |

TABLE 2-continued

|  |  |  | Example 7 | Example 8 | Example 9 | Comparative Example 4 | Comparative Example 5 | Comparative Example 6 |
|---|---|---|---|---|---|---|---|---|
|  | Dimensional expansion coefficient | % | 1.8 | 1.6 | 1.9 | 0.5 | 0.4 | 1.3 |
| In-mold foam molded product | Surface appearance | | ○ | ○ | ○ | ○ | ○ | ○ |
| | Surface wrinkles | | ○ | ○ | ○ | x | x | ○ |
| | Dimensional shrinkage ratio | | ○ | ○ | ○ | x | x | x |

Table 1 and Table 2 reveal that the pre-expanded particles having a large dimensional expansion coefficient of 1.5% or more determined with a thermomechanical analyzer at a constant compressive load of 0.1 g during heating from 30° C. to 100° C. at a temperature increase rate of 10° C./min can yield a molded product having few wrinkles on the surface and having a small dimensional shrinkage ratio even without treatment such as internal pressure application before in-mold foam molding.

REFERENCE SIGNS LIST

Qh Higher-temperature-region melting-peak heat quantity
Ql Lower-temperature-region melting-peak heat quantity
1 Detection bar of TMA
2 Pedestal
3 Polypropylene pre-expanded particle

The invention claimed is:

1. Pre-expanded polypropylene resin particles comprising a polypropylene resin as a substrate resin,
   the resin particles having an average particle weight of 3 mg/particle or less, and
   the pre-expanded particles having a dimensional expansion coefficient of 1.5% or more determined with a thermomechanical analyzer at a constant compressive load of 0.1 g during heating from 30° C. to 100° C. at a temperature increase rate of 10° C./min.

2. An in-mold foam molded product of polypropylene resin obtained by in-mold foam molding of the pre-expanded polypropylene resin particles according to claim 1, without internal pressure application.

* * * * *